(12) United States Patent
Tache (10) Patent No.: US 7,322,652 B1
(45) Date of Patent: Jan. 29, 2008

(54) VEHICLE SEAT WITH INDEPENDENT ADJUSTABLE HEIGHT BOLSTER

(75) Inventor: Oscar Tache, Farmington Hills, MI (US)

(73) Assignee: Nissan Technical Center North America, Inc., Farmington Hills, MI (US)

( * ) Notice: Subject to any disclaimer, the term of this patent is extended or adjusted under 35 U.S.C. 154(b) by 0 days.

(21) Appl. No.: 11/519,300

(22) Filed: Sep. 12, 2006

(51) Int. Cl.
  *B60N 2/62* (2006.01)
(52) U.S. Cl. .................................... 297/284.9
(58) Field of Classification Search ............. 297/284.9, 297/284.1, 284.11, 216.1, 464; 296/68.1, 296/65.01
  See application file for complete search history.

(56) References Cited

U.S. PATENT DOCUMENTS

| | | | | |
|---|---|---|---|---|
| 3,161,076 A | * | 12/1964 | Ferrara | 74/532 |
| 3,550,953 A | * | 12/1970 | Neale | 297/312 |
| 4,522,445 A | * | 6/1985 | Goldner et al. | 297/284.9 |
| 5,040,832 A | * | 8/1991 | Zalewski | 296/65.12 |
| 5,280,997 A | * | 1/1994 | Andres et al. | 297/284.9 |
| 6,039,402 A | * | 3/2000 | Nemoto | 297/411.34 |
| 6,616,229 B2 | * | 9/2003 | Kuster et al. | 297/284.9 |
| 6,629,715 B2 | | 10/2003 | Oh et al. | |
| 6,672,666 B2 | | 1/2004 | Stiller et al. | |
| 6,802,563 B1 | * | 10/2004 | Mysliwiec et al. | 297/284.9 |
| 2005/0046252 A1 | | 3/2005 | McMillen | |

FOREIGN PATENT DOCUMENTS

| | | |
|---|---|---|
| EP | 0 670 240 A1 | 9/1995 |
| WO | 2006/020069 A2 | 2/2006 |

* cited by examiner

*Primary Examiner*—Peter R. Brown
(74) *Attorney, Agent, or Firm*—Young Basile Hanlon MacFarlane & Helmholdt, PC (57) ABSTRACT

A vehicle seat or seat portion including a frame, a central cushion defining a seating surface attached to the frame and a bolster connected to the frame. The bolster is moveable between a first retracted position and at least one second extended position relative to the central cushion. The vehicle seat also includes an actuator coupled to the bolster to move the bolster between the first retracted position and at least one second position.

20 Claims, 5 Drawing Sheets

VEHICLE SEAT WITH INDEPENDENT ADJUSTABLE HEIGHT BOLSTER

BACKGROUND

This disclosure pertains to automotive seats for passenger vehicles. More particularly, this disclosure pertains to vehicular seats having contours and adjustment mechanisms.

Automotive vehicle seats are manufactured with various contours to enhance occupant comfort, assist occupant posture, or encourage occupant position on the vehicle seat relative to the passenger compartment and to any passive or active passenger restraints. Automotive vehicles as well as vehicle seats come in a wide range of styles and types. Depending upon the vehicular type and the needs of the given occupant, entry and exit from the passenger compartment can be challenging. Thus, it would be desirable to provide a vehicle seat or seat element that could facilitate smooth and comfortable movement on and off the seat as well as entry and exit from the passenger compartment. It would also be desirable to provide a vehicle seat that adjusts to the contour and needs of a variety of passengers.

SUMMARY

Disclosed herein is a seat for an automotive vehicle that includes a central cushion. The central cushion is configured to define a seating surface. The vehicle seat also has a first bolster connected to the frame that is movable relative to the central cushion. The first bolster is movable at an angle relative to the seating surface between a first retracted position and at least one extended position. The vehicle seat also includes an actuator coupled to the first bolster to move the first bolster between the first retracted position and at least one second extended position. The seat may also include a suitable frame on which the central cushion can be mounted.

DESCRIPTION OF THE DRAWINGS

The description makes reference to the accompanying drawings wherein like reference numerals refer to like reference characters throughout the several views and in which.

DETAILED DESCRIPTION

Disclosed herein is a vehicle seat suitable for use in automotive vehicles. Also disclosed is a vehicle seat element or component suitable for use in the disclosed vehicle seat. The vehicle seat can facilitate entrance and egress from the passenger compartment of various automotive vehicles. It is also contemplated that the configuration of the vehicle seat may enhance passenger comfort and posture while seated in the associated vehicle.

Figure 1:
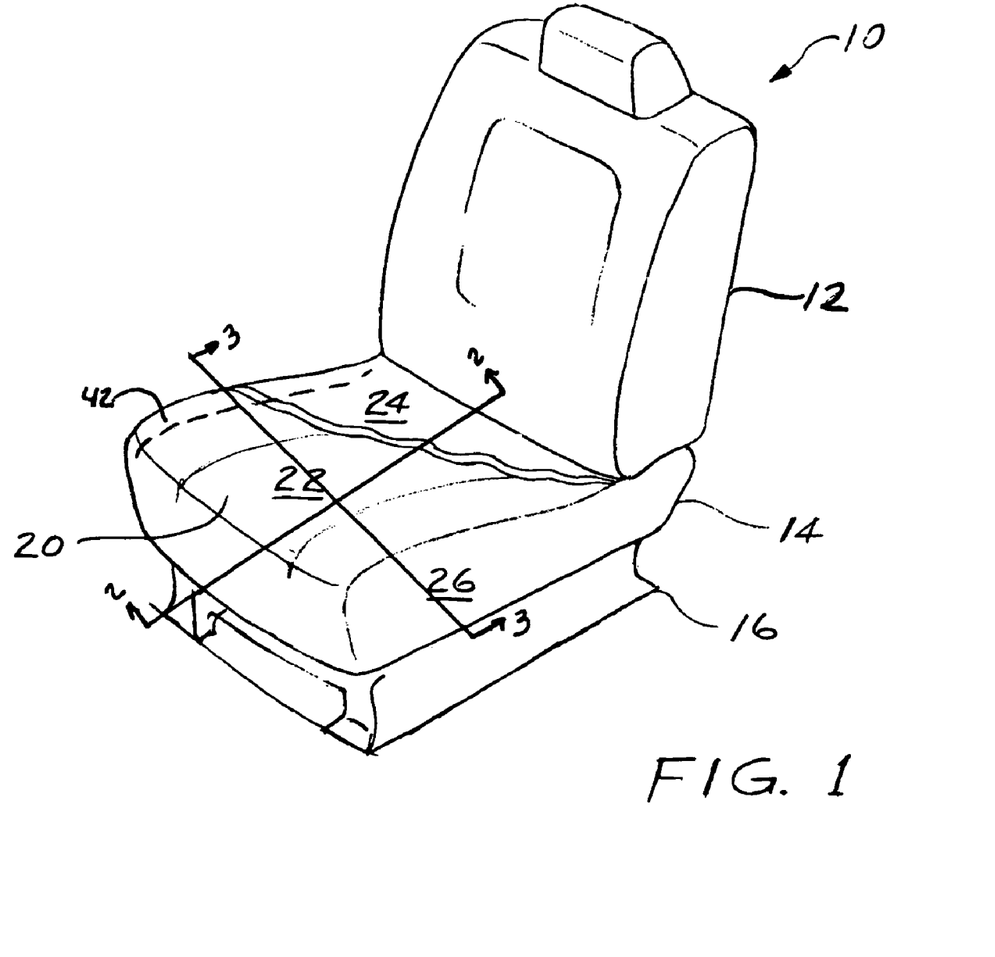
FIG. 1 is a perspective view of a vehicle seat according to an embodiment disclosed herein.
Figure 2:
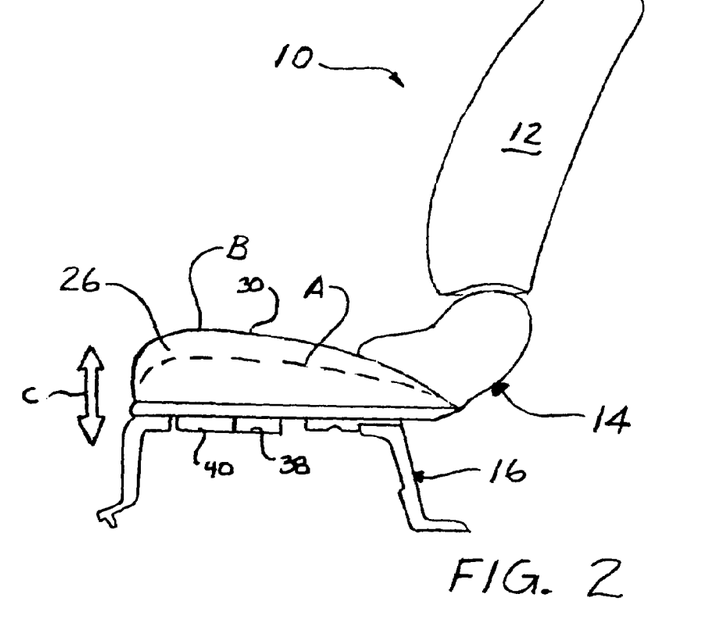
FIG. 2 is a partial cross-section of a vehicle seat of FIG. 1 taken along the 2-2 line in FIG. 1.
Figure 3:
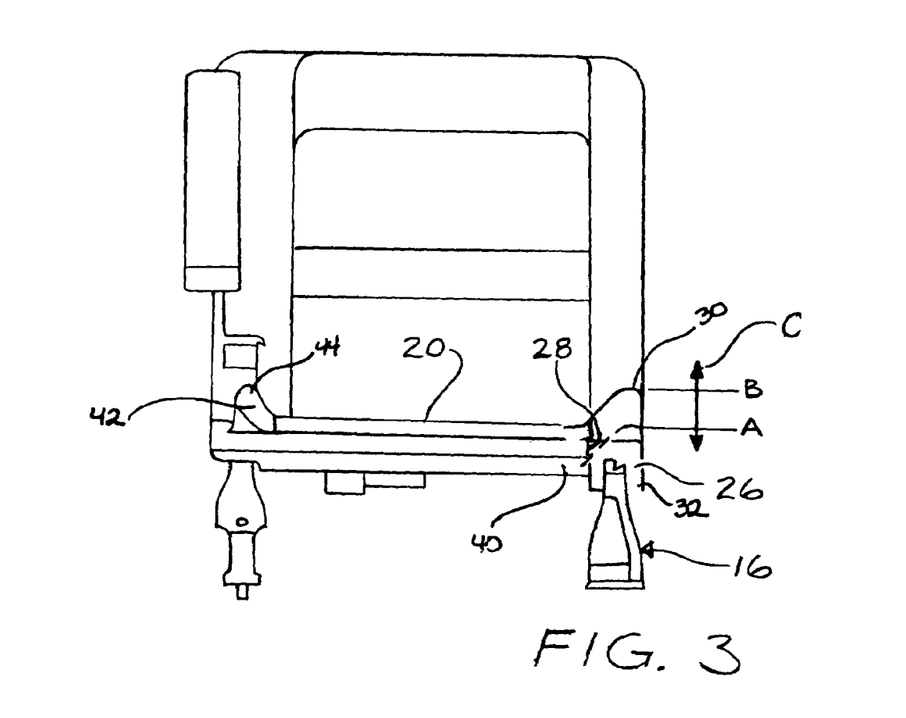
FIG. 3 is a cross-section view of a vehicle seat of FIG. 1 taken along the 3-3 line in FIG. 1.

As illustrated in FIG. 1, vehicle seat 10 includes an upper portion 12 and a lower portion 14. Upper portion 12 of seat 10 can be a suitable back rest or back and arm rest combination. Lower seat portion 14 can be configured as the seating portion of the seat 10. Lower portion 14 can be a contoured member that may include any suitable mounting devices 16 capable of anchoring the seat 10 into secure relationship in the passenger compartment of the vehicle. Typically, mounting member 16 is a seat frame 17 that can be mounted to structural members of the associated vehicle to affix the seat 10 in an associated vehicle. Where desired or required, frame 17 can be configured to provide suitable mounting elements to anchor the seat to the associated vehicle. It is also contemplated that the frame 17 can connect to intermediate mounting elements that anchor the vehicle seat in the passenger compartment of the associated vehicle. While the present disclosure is discussed in terms of the lower seat portion 12, it is to be understood that the upper portions 12 can also be configured in the manner described herein. Configuration of the upper portion 12 can be in addition to, or instead of, configuration of the lower portion 14.

The lower portion of 14 of vehicle seat 10 includes a central cushion 20 defining an upper surface 22 defining a seating surface. The central cushion 20 can have any suitable configuration to comfortably seat a passenger. Thus, the central cushion 20 can have a suitable front-to-back and side-to-side dimensions as desired or required. The upper surface 22 defining the seating surface of the cushion 20 can also include suitable contours and depressions to position the passenger and to enhance seating comfort. The central cushion 20 also defines a front or leading face or edge 23 configured to be positioned in a forward leading orientation when the vehicle seat 10 is in position in the associated vehicle. When a passenger or occupant is in position on the vehicle seat 10, the leading edge 23 central cushion 20 is proximate to the lower portion of the knee joint of the occupant with the knees of the occupant forward of the leading edge 23 of the central cushion 20.

The central cushion 20 can be composed of any suitable material or materials selected for factors including, but not limited to, strength, durability, user comfort, and the like. It is contemplated that the central cushion 20 may be mounted or affixed to frame 17 in any suitable manner. Typically, the central cushion 20 is permanently mounted to the frame in an essentially non-movable manner by any suitable attachment device or devices.

The lower portion 12 of the vehicle seat 10 can also include a suitable upholstery layer 24 in overlying relationship with the central cushion 20. Upholstery layer 24 is shown in partial cutaway in FIG. 1 to better illustrate the relationship of the upholstery layer 24 to the central cushion 20. The upholstery layer 24 can include or be composed of any suitable sheet stock material including, but not limited to, woven fabric, nonwoven fabric, polymeric sheet stock, leather, and the like. Upholstery layer 24 can also include suitable laminates of various materials. Upholstery layer 24 is typically a material that can overlie the various components of the lower portion 14 either individually or collectively.

The lower portion 14 of vehicle seat 10 also includes a first bolster 26 connected to the frame 17. The first bolster 26 is generally configured as an elongate member and is positioned proximate to the central cushion 20 in an essentially side-by-side manner. The first bolster 26 is positioned at an angle to the leading edge 23. In an embodiment as depicted in the drawing figure, the first bolster 26 is positioned perpendicular to the leading edge 23 and generally is coplanar to central cushion 20.

The first bolster 26 is movable at an angle relative to the upper surface 22 of the seating surface of central cushion 20. The first bolster 26 is movable at an angle relative to the upper surface 22 of the seating surface between a first retracted position such as that depicted as line A in FIGS. 2-6 and at least one second extended position such as that depicted as line B in FIGS. 2-6.

When the vehicle seat 10 having lower portion 14 as depicted herein is in position in a suitable automotive vehicle, the first bolster 26 can be oriented such that it is proximate to exterior of the associated vehicle. As depicted in the drawing figure, the first bolster 26 is positioned on right side as viewed from the front of seat 10. Where desired or required, the associated vehicle can be equipped with multiple seats 10 having right or left handed orientations depending upon positioning in the vehicle.

The first bolster 26 is in abutting relationship to a side face 28 of cushion 20 and moveable relative thereto. In an embodiment as depicted in the drawing figures, first bolster 26 moves in a plane essentially vertical relative to upper surface 22 of seating surface as illustrated by arrow C. It is within the purview of this disclosure that first bolster 26 moves at a suitable angle other than vertical between a first retracted position A and a second extended position B.

When first bolster 26 is in the retracted position, it is contemplated that at least a portion of the uppermost region 30 will be at a level that facilitates passenger egress and entry to and from the vehicle seat 10. In the retracted position, at least a portion of the uppermost region 30 of first bolster 26 is in a position essentially planar with upper surface 22 of the seating surface of central cushion 20. In an embodiment such as that disclosed in FIGS. 2-4, the retracted position is one that places essentially all of the uppermost portion 30 of the first bolster 26 in coplanar relationship with the sating surface. It is also contemplated that the retracted position may be one that positions only a portion of the uppermost region 30 of first bolster 26 in such coplanar relationship while other portions remain at a position elevated relative to the plane defined by the upper surface 22 of the central cushion 20.

The term "facilitates passenger egress from and entry into the vehicle seat 10" is taken to mean movement of the first bolster 26 relative to the central cushion 20 into a retracted or partially retracted portion that will permit and encourage movement of the passenger relative to the vehicle seat 10. Such movement includes, but is not limited to, sliding motion of the occupant's gluteal muscles relative to the seating surface.

Figure 4:
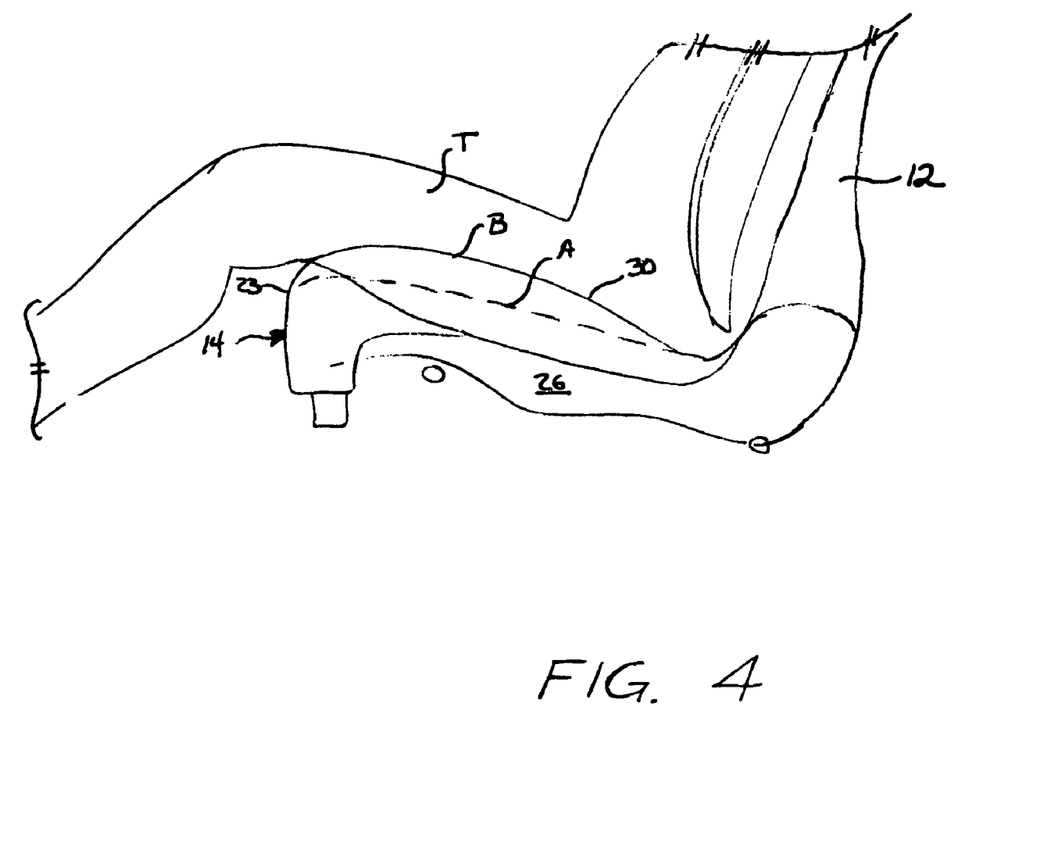
FIG. 4 is a partial side view showing an embodiment of an adjustable height bolster in raised and retracted positions relative to a passenger's thigh.

In the fully extended position B the uppermost region 30 of first bolster 26 extends upward to retain and surround passenger thigh T, particularly in the region of the upper thigh as depicted in FIG. 4. When in the retracted position, the uppermost region 30 of first bolster 26 is essentially coplanar with the upper surface 22 of the central cushion 20 for at least a portion of the central cushion proximate to the leading or front edge 23 of the central cushion 20. The retracted position A permits lateral movement of the passenger into and out of position on the central cushion 20; particularly along the region where the uppermost portion 30 of the first bolster 26 is essentially coplanar with the upper surface of the central cushion 20.

When in a second, fully extended position B, the uppermost region 30 is in an elevated position capable of surrounding and positioning a portion of thigh T of the occupant on the central cushion 20. This can serve to orient the occupant during vehicle operation and/or contribute to occupant comfort while in the seat 10.

Where desired or required, the first bolster 26 may be positionable at a variety of intermediate elevated positions between the determined by various factors including but not limited to the passenger size and build, positioning requirements relative to characteristics such as safety restraints, position of the vehicle seat 10 and the like. When in the second, fully extended position, the first bolster 26 may attain or exceed a height in which the uppermost region 30 of first bolster 26 is at a plane essentially equal to a plane defined by other structural elements of the seat such as various fixed bolsters or the like.

The first bolster 26 can have any suitable geometric size and configuration for use with the given vehicle seat 10. As a non-limiting example, an embodiment depicted in the drawing figures illustrates a first bolster 26 that has a triangular lateral cross section with a rectangular base 32 and an opposed uppermost region 30 both contiguously joined to a sloping side face 34 interposed between the rectangular base 32 and the uppermost region 30. The first bolster 26 is positioned relative to the central cushion 20 such that the sloping face 34 is oriented inwardly toward the central cushion 20.

The first bolster 26 can be of any suitable material or materials of construction. In an embodiment as disclosed herein, the first bolster 26 can have an outer cushioning material such as foam, padding, etc. overlying a suitable structural support. The structural support can be connected to the frame 17 in any suitable manner that permits independent movement of the bolster 26 relative to the central cushion 20.

First bolster 26 can be coupled to a suitable actuator 38. The actuator 38 is any suitable device configured to move the first bolster 26 between the first retracted position depicted as A and the second extended position depicted as B. The actuator 38 can include such devices and mechanisms as needed or desired to raise and lower the moveable bolster 26 relative to the upper surface 22 of the seating surface of the central cushion 20.

Thus the actuator 38 can include a motor powered by a suitable power source operating on a suitable elevator mechanism. Alternately, the actuator 38 can be configured as a user-driven mechanism that is raised or lowered by user action such as cranking or the like. If desired, the user-driven mechanism can include suitable levers associated with the frame 17 to permit elevation or lowering when required.

When the actuator 38 is motor-powered, the actuator 38 can be configured to operate upon receipt of a desired command signal received from a source such as a control module 40. Control module 40 can be configured to receive and interpret input signals and translate the signals into one or more commands. The input signal or signals can be derived from one or more triggering events originating from various sources in the automobile. The input signal can include at least one of user-activated switch located in the vehicle, a position of a key relative to an ignition, a door sensor, a parking brake sensor, a transmission position sensor, a seat sensor. Suitable user-activate switches can be positioned wherever desired on the vehicle seat 10 or associated vehicle.

The input signal can also be derived from the position of a key relative to an ignition of the vehicle or by a signal transmitted by the car key (e.g., a smart key, an intelligent key or a remote-control key) together with a door lock-release command signal. Where desired or required, the system can be configured to accommodate the needs of different occupants of the seat. For instance various settings can be programmed in for the needs of different occupants and the initial actuation can include selection among the various settings.

By way of non-limiting example, the first bolster 26 can be maintained in the retracted position B when the key is removed from the ignition and/or when the engine is not running. An event such as insertion of the key into the vehicle ignition, transmission of a suitable actuation command from a smart key or the like, or movement of the ignition into an "on" position can generate an input signal that is received by control module 40 and results in a command to the actuator 38 to raise the first bolster 26 to the second elevated position B. Alternately, the input signal can be generated by an event such as closure of that vehicle door and/or movement of the transmission such as movement out of "park" into one of the other gears. Where desired, the input signal can be generated from information derived from a seat sensor or the like. Where information is derived from a seat sensor, data that the seat is occupied could be suitable to result in an input signal that triggers a command to elevate the first bolster 26 to the raised position. Conversely, data that the engine operation has been discontinued by the user or the associated vehicle door is opened may constitute a triggering event that yields an input signal received by the control module 40 and interpreted as a command to retract the first bolster 26.

Where desired or required, the control module 40 can be configured to produce commands determining and controlling other functions of the first bolster 26 in addition to movement between the retracted position and the at least one extended position. Non-limiting examples of such command may include extending the first bolster to one or more positions intermediate to the extended position in response to one or more factors communicated as input signals. Examples of additional factors include, but are not limited to, passenger weight and/or size, position of vehicle seat relative to structural elements of the vehicle and the like.

Figure 5:
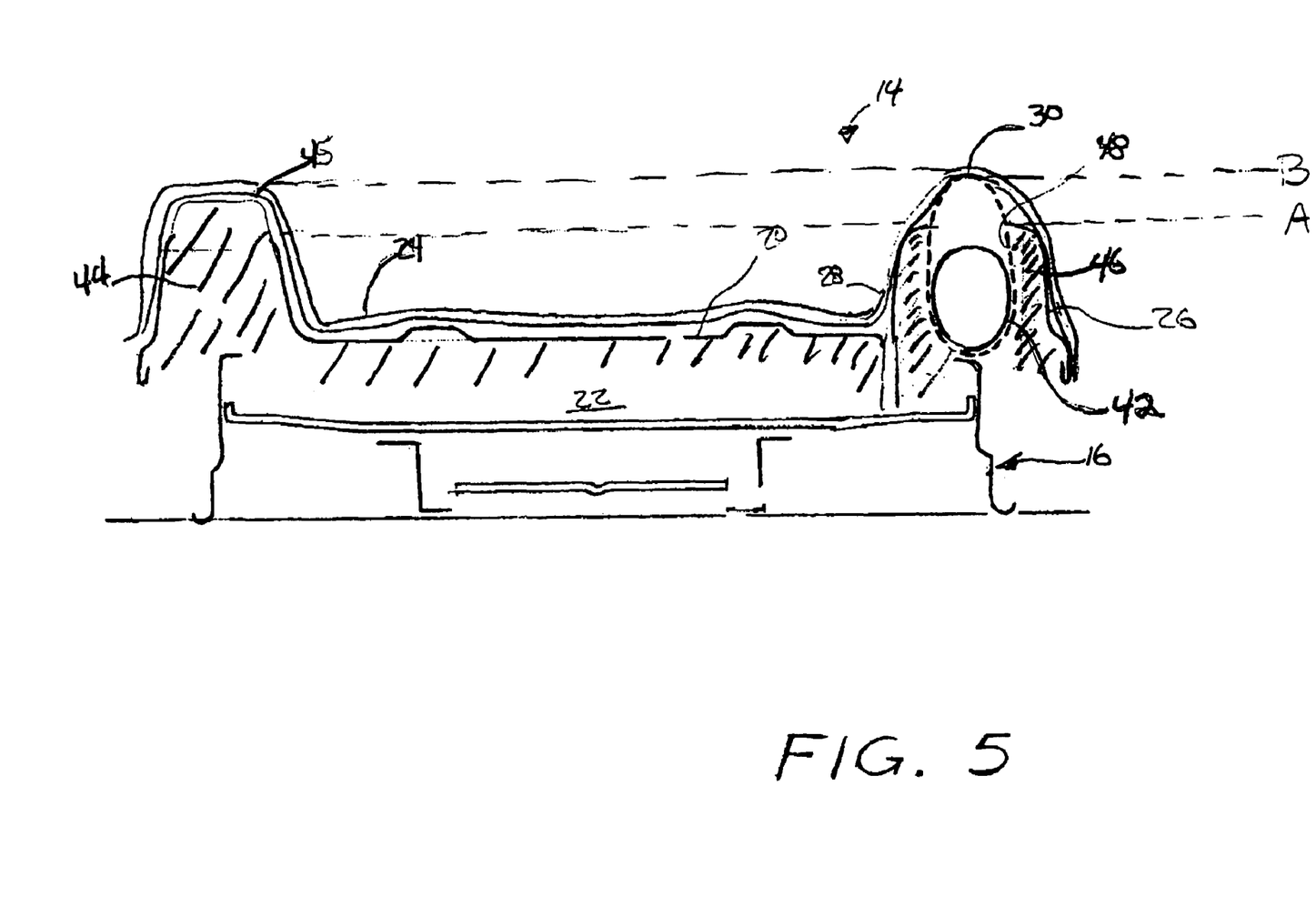
FIG. 5 is a cross-sectional detail of an embodiment of the adjustable height bolster as disclosed herein.

The first bolster 26 includes a suitable mechanism or mechanisms to permit the movement of the first bolster 26 relative to the upper surface 22 of central cushion 20. The mechanism can be any suitable device including, but not limited to, pneumatic and/or mechanical devices. As depicted in FIG. 5, the mechanism can be configured with at least one bladder 42 that can be inflated and deflated with the action of the actuator 38 upon receipt of a suitable input signal. In the deflated state, the bladder 42 has a volume less than or equal to that sufficient to maintain the first bolster 26 in the retracted position. In the inflated state, the bladder 42 has a volume sufficient to extend the uppermost region 30 of first bolster 26 to the second extended position.

The bladder 42 may be positioned and configured so as to raise and/or lower the entire structure of the first bolster 26 relative to central cushion 20. Alternately, the bladder 42 may act in concert with the structure of first bolster 26 to alter the effective height of the bolster 26 relative to the central cushion 20. The bladder 42 may be used to elongate the first bolster 26. It is also contemplated that the bolster 26 may configured in manner that attains both structural elevation and effective elevation.

In an embodiment as depicted in FIG. 5, the bladder 42 is mounted in the interior of bolster 26. Inflation of the bladder 42 urges at least a portion of the uppermost region 30 of the first bolster 26 into the projected or elevated position. Deflation of the bladder 42 permits at least a portion of the uppermost region 30 of the first bolster to reside in the retracted position.

In the retracted position, the uppermost region 30 of the first bolster 26 is at an elevation that facilitates movement of a passenger into and out of position in the vehicle seat 10. Thus at least a portion of the uppermost region 30 of the first bolster 26 can be essentially planar with the upper surface 22 of the central cushion 20 when the first bolster 26 is in the retracted position. All or most of the uppermost region is in coplanar relationship with the corresponding portion of the upper surface 22. It is also within the scope of this disclosure that, in the retracted position, at least a portion of the uppermost region 30 of first bolster 26 is at a location elevated above the plane defined by the corresponding region of the upper surface 22 of the central cushion 20. In such embodiments, the portion of first bolster 26 that remains elevated above the upper surface 22 of the central cushion 20 is at an elevation and in a region that does not impede occupant egress or entry. In one non-limiting example of a suitable configuration, the forward portion of the uppermost region 30 proximate to the leading edge 23 is coplanar with the upper surface 22 of the central cushion 20 when the first bolster 26 is in the retracted position while the rearward portion is though retracted relative to the upper surface 22 of the central cushion 20.

In an embodiment as depicted in FIG. 5, the bladder 42 is mounted in the bolster 26 with suitable structural cushioning material 46 surrounding it. Bladder 42 is positioned in channel 48 defined in the structural cushioning material 46. Inflation of bladder 42 triggers projection of the bladder 42 relative to the cushioning material 46 and channel 48 into an elevated or projected position as at reference numeral B. In an embodiment as depicted in FIG. 5, the central cushion 20 and the moveable bolster 26 are covered by a suitable upholstery layer 24. The region of upholstery layer 24 proximate to bladder 42 can be configured to permit expansion of the bladder 42 to the projected position such as that defined as plane B.

As depicted in FIG. 5, the upholstery layer 28 covers the central cushion 20 and the first bolster 26 in a unitary manner. It is also possible to have the central cushion 20 and the first bolster 26 covered separately by distinct pieces of upholstery material as desired or required. An embodiment depicting separate covers for upholstery layers 26, 26' can be found in FIG. 6.

Figure 6:
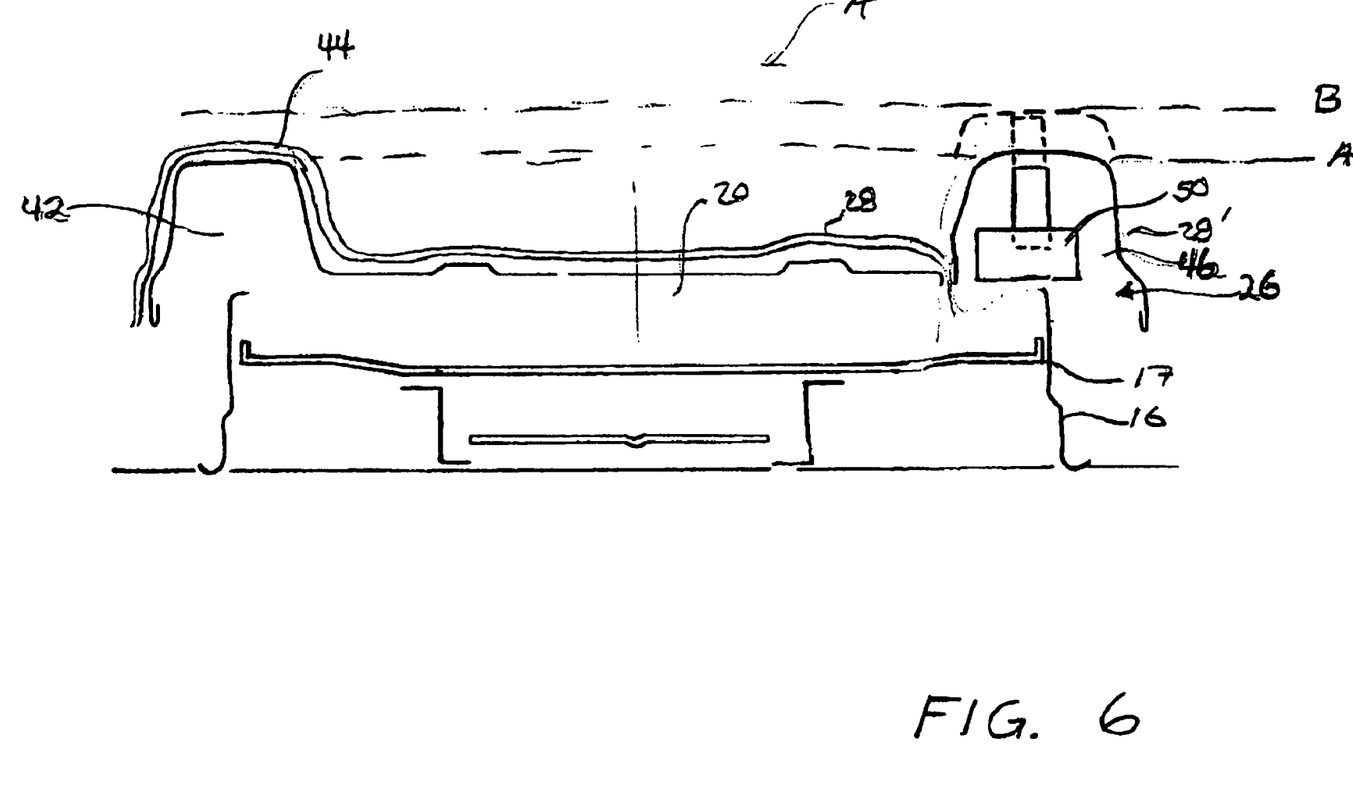
FIG. 6 is a cross-sectional detail of an alternate embodiment of the adjustable height bolster as disclosed herein.

In an embodiment as depicted in FIG. 6, the mechanism permitting movement of the first bolster 26 relative to the central cushion 20 is a pneumatic cylinder 50. The pneumatic cylinder 50 is suitably configured to raise and lower the associated first bolster 26 relative to the central cushion 20. As depicted the pneumatic cylinder 50 is mounted in the first bolster 26 relative to frame 17. The pneumatic cylinder 50 is configured to act on the first bolster 26 to move it between at least one retracted position and at least one extended position (shown in phantom) by the action of the actuator 38 upon receipt of a command from the command module 40. The pneumatic cylinder 50 can be positioned in or below structural cushioning material 46 of the first bolster 26

The seat portion 14 can also include a second bolster 44 having a fixed height. The second bolster 44 is connected to the central cushion 20 at a location opposed to the first bolster 26. The second bolster 44 can be connected to the frame 17 in separate and proximate relationship with the central cushion 20. Alternately, the second bolster 44 can be contiguously connected to the central cushion 20 to form a unitary bolster and central cushion element as depicted in FIGS. 5 and 6.

The second bolster 44 has an uppermost region 45 that projects to an elevation above the plane defined by the upper face 22 of the central cushion 20. In the vehicle seat as disclosed herein, the first bolster 26 has at least one extended position in which the uppermost portion 30 of first bolster 26 projects above the upper face 22 of central cushion 20. The extended position as defined at B can be coplanar with the uppermost portion 45 of second fixed bolster 44. Non-limiting examples of such configurations are the configurations depicted in FIGS. 3 and 5. It is also contemplated that the first bolster 26 can have at least one extended position that is greater than the planar position of the second fixed bolster 44. One non-limiting example of such a configuration is depicted in the embodiment as shown in FIG. 6.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A seat system for use in an automotive vehicle, comprising:
    a seat having a back rest portion and a bottom seat portion, the bottom seat portion including a first bolster and an opposed second bolster,
    wherein the first bolster is positioned proximate to the bottom seat portion and proximate to the exterior of the vehicle, the first bolster configured to be adjustable in elevation relative to the bottom seat portion between an extended position and a retracted position, the extended position configured to facilitate occupant comfort while in the seat and the retracted position configured to facilitate occupant ingress and egress to/from the seat, and wherein the second bolster is positioned proximate to the bottom seat portion and opposite the first bolster;
    an actuator configured to adjust the first bolster between the extended position and the retracted position; and
    a control module configured to generate a first command signal when a vehicle condition indicates occupant readiness to ingress and egress to/from the seat is determined;
    wherein the actuator adjusts the first bolster to the retracted position upon receipt of the first command signal.

2. The vehicle seat system of claim 1, wherein the first bolster comprises at least one of an inflatable bladder and a pneumatic cylinder responsive to the actuator.

3. The vehicle seat system of claim 1, wherein the control module receives at least one input signal from at least one vehicle condition sensor.

4. The vehicle seat system of claim 3, wherein the at least one vehicle condition sensor comprises at least one of an ignition position sensor, a door position sensor, a transmission position sensor, and a parking brake sensor.

5. The vehicle seat system of claim 3, wherein the control module analyzes the at least one input signal to determine occupant readiness to ingress and egress to/from the seat.

6. The vehicle seat system of claim 3, wherein the control module analyzes the at least one input signal to determine completion of occupant ingress and egress to/from the seat.

7. A vehicle seat system of claim 6, wherein the control module is configured to generate a second command signal indicating completion of occupant ingress and egress to/from the seat.

8. The vehicle seat system of claim 7, wherein the actuator adjusts the first bolster to the extended position upon receipt of the second command signal.

9. The vehicle seat system of claim 1, wherein the second bolster is fixed in elevation relative to the bottom seat portion.

10. A method for facilitating occupant ingress and egress to/from a vehicle having a seat equipped with an adjustable bolster proximate to a bottom seat portion and an actuator for adjusting the adjustable bolster, the method comprising:
    detecting a first vehicle condition indicating occupant readiness to ingress and egress to/from the seat; and
    retracting the adjustable bolster lower in elevation relative to the bottom seat portion to facilitate occupant ingress and egress to/from the seat when the first vehicle condition is detected.

11. The method of claim 10, wherein the detecting first vehicle condition step comprises the step of receiving an input signal from at least one vehicle condition sensor including at least one of an ignition position sensor, a door position sensor, a transmission position sensor, and a parking brake sensor.

12. The method of claim 11 further comprising the steps of:
    detecting a second vehicle condition indicating completion of occupant ingress and egress to/from the seat; and
    extending the adjustable bolster higher in elevation relative to the bottom seat portion to comfort occupant when the second vehicle condition is detected.

13. The method of claim 12, wherein the detecting second vehicle condition step comprises the step of receiving an input signal from at least one vehicle condition sensor including at least one of an ignition position sensor, a door position sensor, a transmission position sensor, and a parking brake sensor.

14. A vehicle seat system, comprising:
    a seat having a back rest portion and a bottom seat portion, the bottom seat portion including a bolster positioned proximate to the bottom seat portion and adjustable in elevation relative to the bottom seat portion between an extended position to comfort occupant while in the seat and a retracted position to facilitate occupant ingress and egress to/from the seat;
    an actuator configured to adjust the bolster between the extended position and the retracted position; and
    means for determining a first vehicle condition indicative of occupant readiness to ingress and egress to/from the seat,
    wherein the actuator adjusts the bolster to the retracted position to facilitate occupant ingress and egress to/from the seat when the first vehicle condition is determined.

15. The vehicle scat system of claim 14, wherein the means for determining a first vehicle condition includes a control module configured to receive at least one input signal from at least one vehicle condition sensor.

16. The vehicle seat system of claim 15, wherein the control module is further configured to analyze the at least one input signal to determine the first vehicle condition indicative of occupant readiness to ingress and egress to/from the seat.

17. The vehicle seat system of claim 14, further comprising means for determining a second vehicle condition indicative of completion of occupant ingress and egress to/from the seat.

18. The vehicle seat system of claim 17, wherein the means for determining the second vehicle condition includes a control module configured to receive at least one input signal from at least one vehicle condition sensor.

19. The vehicle seat system of claim 18, wherein the control module is configured to generate a second command signal indicating completion of occupant ingress and egress to/from the seat.

20. The vehicle seat system of claim 19, wherein the actuator adjusts the first bolster to the extended position upon receipt of the second command signal.

* * * * *